(12) United States Patent
Mitamura

(10) Patent No.: US 6,345,970 B1
(45) Date of Patent: Feb. 12, 2002

(54) HYDRAULIC SYSTEM FOR TIRE CURING PRESS

(75) Inventor: Hisashi Mitamura, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/629,825

(22) Filed: Jul. 31, 2000

(30) Foreign Application Priority Data

Aug. 24, 1999 (JP) .......................................... 11-236309

(51) Int. Cl.[7] .......................... B29C 35/02; B30B 15/16
(52) U.S. Cl. ...................... 425/28.1; 425/47; 425/451.9
(58) Field of Search .......................... 425/28.1, 29, 35, 425/47, 451.9

(56) References Cited

U.S. PATENT DOCUMENTS

| 4,274,820 A | * | 6/1981 | Fike ............................ 425/47 |
|---|---|---|---|
| 4,383,808 A | * | 5/1983 | Kubo et al. ................... 425/47 |
| 4,695,235 A | * | 9/1987 | Ichikawa et al. .............. 425/35 |
| 5,820,886 A | * | 10/1998 | Irie .............................. 425/47 |

* cited by examiner

Primary Examiner—James P. Mackey
(74) Attorney, Agent, or Firm—Oblon, Spivak, McClelland, Maier & Neustadt, P.C.

(57) ABSTRACT

A hydraulic system for a tire curing press includes at least one tire press operated by a hydraulic cylinder and a hydraulic control valve; a hydraulic unit for supplying pressure oil of a fixed pressure; an accumulator circuit for accumulating pressure oil from said hydraulic unit to supply the accumulated pressure oil to the hydraulic cylinder and the hydraulic control valve; and a check valve provided on every tire press. The check valve cuts off pressure oil from the hydraulic unit and the accumulator circuit during vulcanization of the tire press. Thereby, it is possible to limit the operation of the hydraulic unit during the vulcanization which results in energy saving operation.

2 Claims, 5 Drawing Sheets

PRIOR ART FIG.4
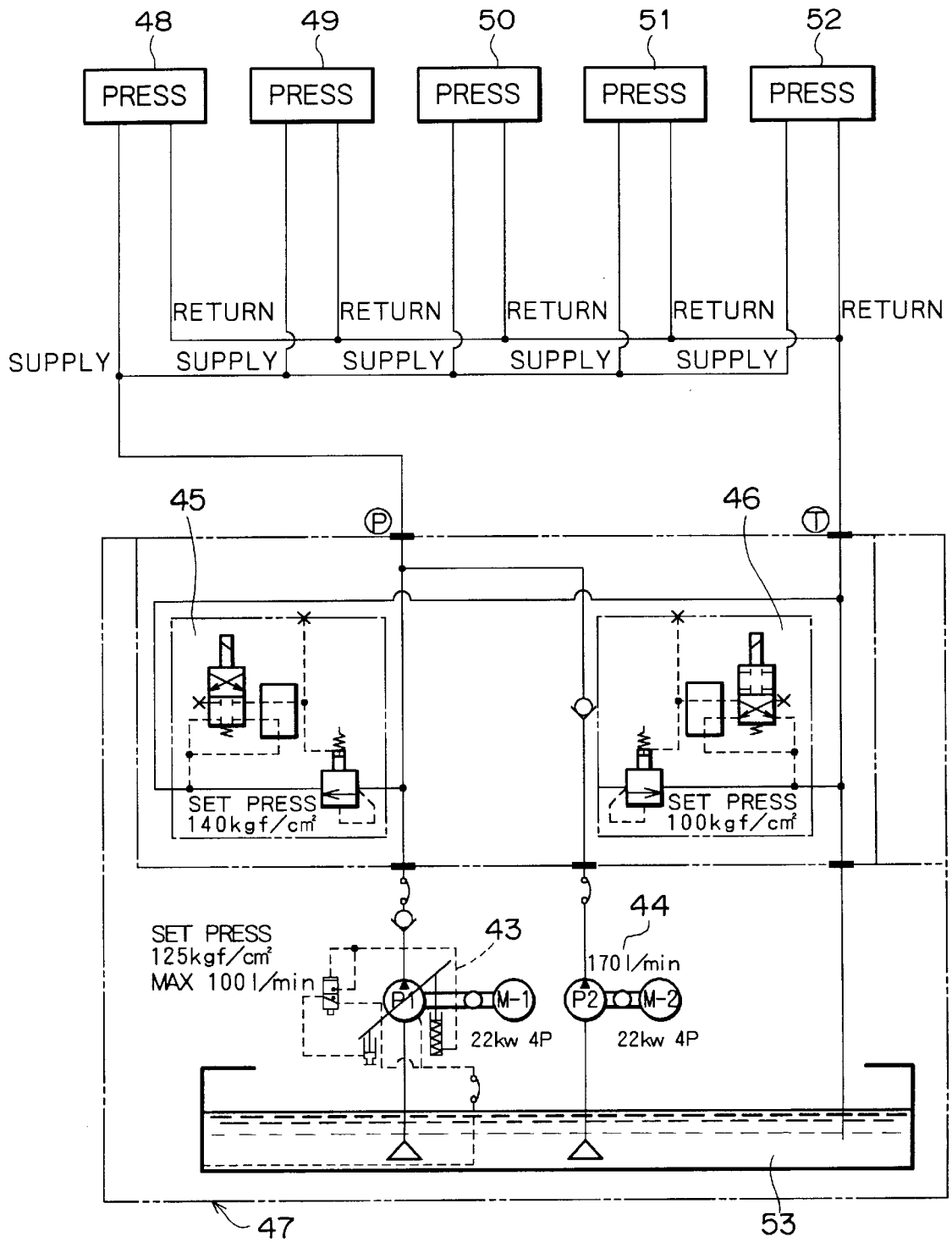

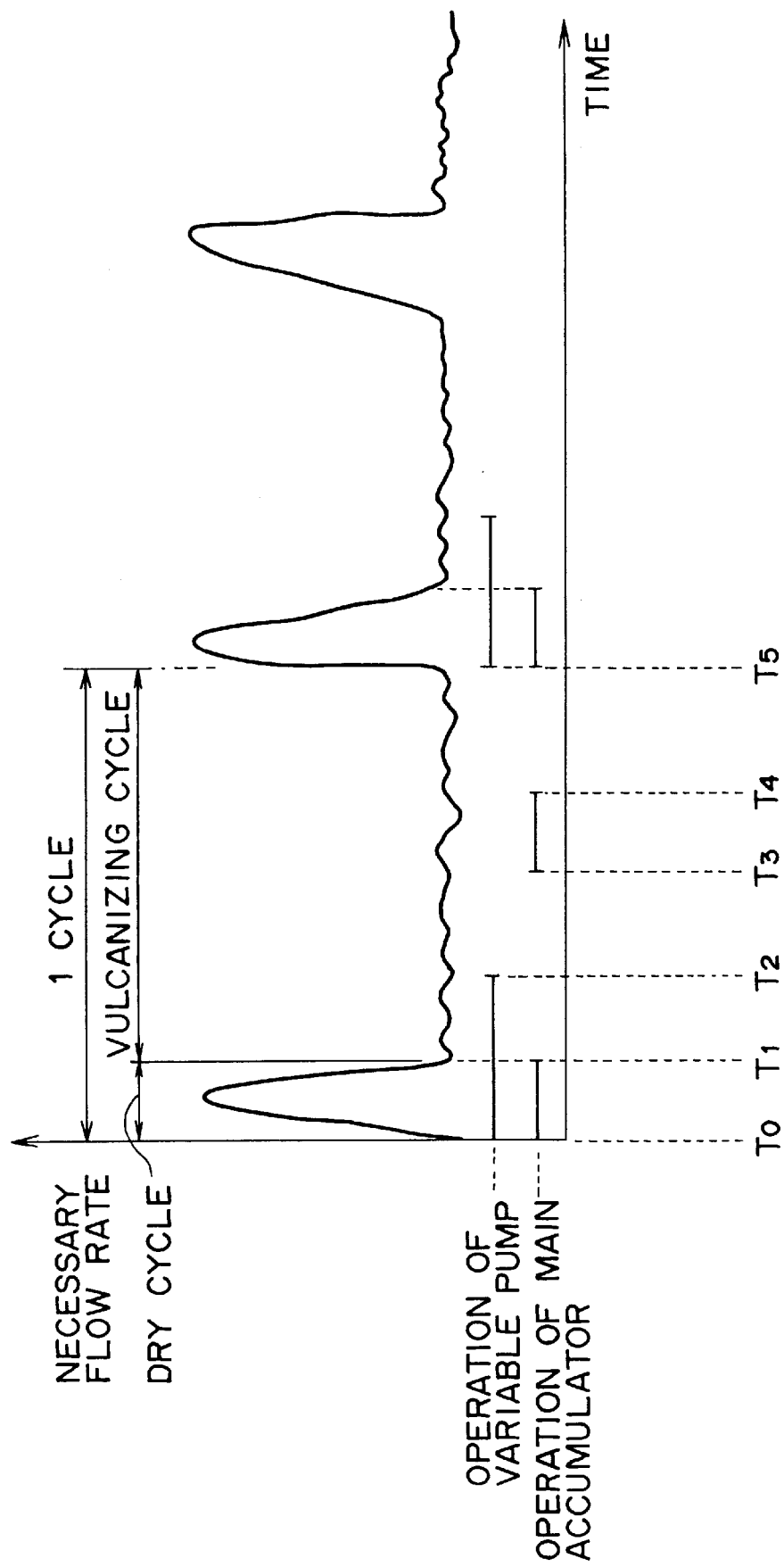

HYDRAULIC SYSTEM FOR TIRE CURING PRESS

BACKGROUND OF THE INVENTION

1. Field of the Invention

The present invention relates to a hydraulic actuator used for various mechanisms of a hydraulic type tire press, and a hydraulic system for a tire curing press for supplying pressure oil to a hydraulic control valve.

2. Description of the Related Art

A press frame of a tire vulcanizer (a tire press) comprises, as shown in FIG. 3, an upper frame 31, a lower frame 32, and a side frame 33, and a metal mold 35 is secured to the lower frame 32 through a lower mold mounting member 34. An upper metal mold 36 is secured to an upper mold mounting member 37, and is closable with respect to the lower metal mold 35. A piston rod 38 is secured to the mounting member 37, the mounting member 37 being moved up and down along a vertically elevating guide 39 by operation of an elevating cylinder 26. A pressurizing and transmitting rod 40 is stood upright on the mounting member 37, and a clamping cylinder 27 for transmitting a pressurizing force to the pressurizing and transmitting rod 40 is fixedly mounted on the upper frame 31.

The tire vulcanizer repeats the inserting step for inserting a green tire prior to vulcanization between the upper and lower metal molds 35 and 36 to close the upper and lower metal molds 35 and 36, the vulcanizing step for loading the clamping force to the upper and lower metal molds 35 and 36 so that the tire is not forced out during vulcanization to vulcanize the tire, and the taking out step for opening the mold in order to take out the vulcanized tire to vulcanize the tires sequentially. As shown in FIG. 5, the inserting step and the taking out step are referred to as "dry cycle", and the step for loading the clamping force to vulcanize the tire is referred to as "vulcanizing cycle". That is, the operating cycle of the tire vulcanizer is divided broadly into the dry cycle and the vulcanizing cycle.

The conventional hydraulic unit in the tire curing press is generally designed so that as shown in FIG. 4, a large capacity, 100 l/min, variable capacity pump 43 with cut-off pressure set to 125 kgf/cm$^2$, and a large capacity, 170 l/min, fixed capacity pump 44 are respectively driven by a 22 kw motor to supply pressure oil to five presses 48 to 52. An unload valve 45 having 140 kgf/cm$^2$ of set pressure is connected to the variable pump 43, and an unload valve 46 having 100 kgf/cm$^2$ of set pressure is connected to the fixed pump 44. These unload valves 45 and 46 have a relief function for protecting line pressure, and a role for compensating for operating pressure of the press, and are designed so that pressure oil discharged from the pumps is switched to the press sides 48 to 52 and the tank side 53. In the conventional hydraulic unit 47, in the press closing operation during the dry cycle, pressure oil is supplied to the press sides 48 to 52 by the variable pump 43 and the fixed pump 44; and during the vulcanization, necessary flow rate is supplied to the presses 48 to 52 sides merely by the variable pump 43 to compensate for pressure. The dry cycle in the presses is approximately 1/10 of the vulcanizing cycle, and the variable pump 43 is continuously operated in order to compensate for pressure.

The variable pump 43 is always in the on-load state during the dry cycle and during the vulcanization as well, and pressure oil discharged from the pump 43 is supplied to the presses 48 to 52 sides. However, during the vulcanization, pressure oil is merely necessary for the clamping cylinder and a part of actuators such as a clamp portion, and the flow rate necessary for the presses 48 to 52 sides is lessened as a whole. Therefore, the discharge flow rate of the variable pump 43 is automatically adjusted to the minimum discharge flow rate to supply pressure oil.

However, since the variable pump always supplies pressure oil to the press sides, pressure is always applied to hydraulic lines on the press sides after the hydraulic pump to cause a leakage of the about 5 to 10 l/min mark from the hydraulic valve. Further, the flow rate necessary for the presses is variable as shown in FIG. 5, and the constant flow rate is not always necessary, and therefore, the fixed pump is in the unload state during the vulcanization, and the discharged pressure oil is thrown into the tank. As described above, in the conventional hydraulic system, the motor of the hydraulic unit is continuously operated despite the fact that the most machineries stop during the vulcanization so that two pumps are being operated without stopping. Further, since the leakage from the hydraulic valve is incontinent, there poses a problem in that power (energy) is used wastefully so that consuming electric power of the hydraulic unit is wasted.

SUMMARY OF THE INVENTION

It is an object of the present invention to provide a hydraulic system for a tire curing press for limiting operation of a hydraulic unit during vulcanization by which machineries are stopped.

The present invention provides a hydraulic system for a tire vulcanizer in which various hydraulic cylinders of a tire vulcanizer for vulcanizing and molding tires and a hydraulic unit for supplying pressure oil having a fixed pressure are connected by hydraulic lines, comprising the one or more tire vulcanizers operated by said various hydraulic cylinders, a hydraulic unit for supplying pressure oil of fixed pressure, an accumulator circuit for supplying the accumulated pressure oil to said various hydraulic cylinders, and check means provided every said tire vulcanizer so that during vulcanization of said tire vulcanizer, pressure oil of said hydraulic unit and said accumulator circuit is cut off, and in the operation of said tire vulcanizer, the cutting off is released to cause the pressure oil of said hydraulic unit and said accumulator circuit to pass.

In this case, during the dry cycle, pressure oil is supplied from the hydraulic unit and the accumulator; and during the vulcanization, a master valve constituting the check means is closed to cut off a supply of pressure oil from the accumulator and the hydraulic unit to the various hydraulic cylinders. The hydraulic unit supplies pressure oil to the accumulator to accumulate it during the time pressure oil is cut of a supply to the various hydraulic cylinders. Thereby, pressure oil can be supplied at a stretch from the hydraulic unit and the accumulator to the various cylinders during the dry cycle, and a pump having a smaller capacity than that of conventional pumps without delaying the dry cycle time for about 1 to 2 minutes. When a supply of pressure oil from the hydraulic unit and the accumulator is cut off by the master valve constituting the check means, it is not necessary to always supply pressure oil of fixed quantity in order to compensate for a leakage from the hydraulic valve in each vulcanizer but a supply quantity of pressure oil during the vulcanization can be reduced, thus enabling reduction of consuming electric power of the hydraulic unit.

The present invention further provides, in addition to the above-described constitution, a hydraulic system in which every said tire vulcanizer is provided an auxiliary accumulator for accumulating the remainder of the discharged flow rate of said hydraulic unit, if the discharged flow rate of said hydraulic unit and said main accumulator exceeds the necessary flow rate of said tire vulcanizer, to compensate for pressure of said various hydraulic cylinders during the vulcanization.

In this case, since pressure oil can be supplied to clamps or the like requiring pressure oil during vulcanization by the auxiliary accumulator without throwing out the remainder of the discharged flow rate of the hydraulic unit as in prior art, and therefore, the effective utilization of pressure oil can be achieved, and the consuming electric power of the hydraulic unit can be further reduced.

Further, according to the present invention, in addition to the above-described constitution, the hydraulic unit turns on and off a supply of pressure oil with fixed pressure of the hydraulic line being a reference.

In this case, when the hydraulic line reaches fixed pressure, the hydraulic unit is stopped, and pressure oil can be supplied merely by the main accumulator, whereby the hydraulic unit need not be operated always during the vulcanization, and the consuming power of the hydraulic unit can be further reduced.

Furthermore, according to the present invention, in addition to the above-described constitution, a supply of pressure oil and the operation of the pump are turned on and off with whether or not the tire vulcanizer is in the vulcanizing operation state being a reference, whereby pressure oil more than as needed is not supplied, and the consuming power of the hydraulic unit can be further reduced.

BRIEF DESCRIPTION OF THE DRAWINGS

FIG. 4 is a view for explaining a conventional hydraulic system for a tire curing press; and FIG. 5 is a view for explaining operating cycles of a tire vulcanizer according to the present embodiment.

DESCRIPTION OF THE PREFERRED EMBODIMENTS

Figure 1:
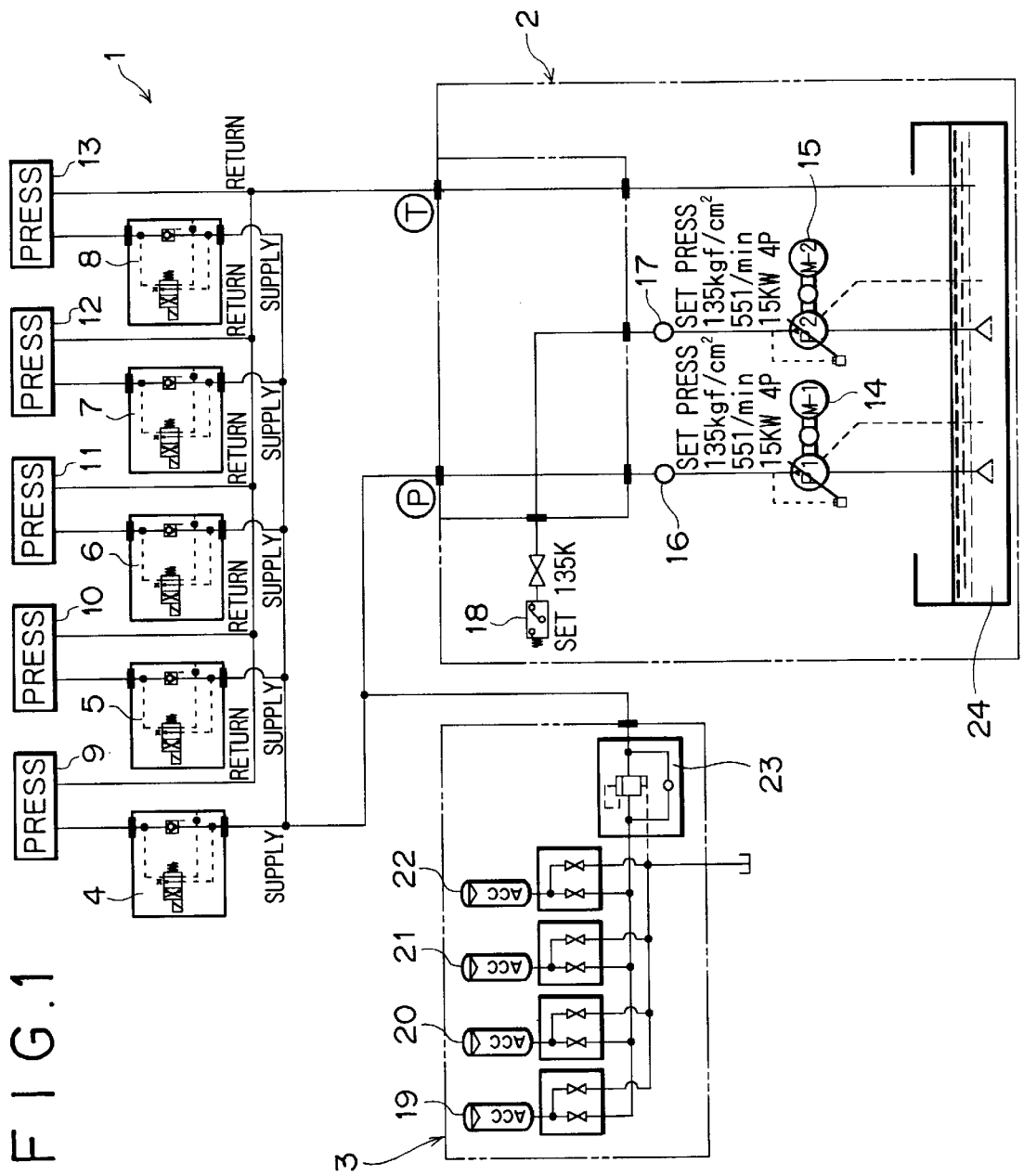
FIG. 1 is a view for explaining a hydraulic system for a tire curing press according to the present embodiment.

The embodiments of the present invention will be described with reference to the drawings. Since the tire vulcanizer is similar to that described in the related art, a description thereof will be omitted. As shown in FIG. 1, a hydraulic system 1 for a tire curing press is divided broadly into a hydraulic unit 2, a main accumulator circuit 3, and a hydraulic circuit 25 on the vulcanizer side from master valves 4 to 8 constituting check means (see FIG. 2). The hydraulic unit 2 comprises two small capacity variable pumps 14 and 15, a hydraulic tank 24, and a pressure switch 18 so as to supply pressure oil to vulcanizers 9 to 13. The small capacity variable pumps 14 and 15 are driven by a small motor of approximately 15 kw so as to supply oil to a hydraulic tank 24. Check valves 16 and 17 are connected to the vulcanizers 9 to 13 sides of the variable pumps 14 and 15 so as to prevent the back flow to the variable pumps 14 and 15. Further, a hydraulic line is joined after the check valves 16 and 17, and the pressure switch 18 is connected to the junction. The pressure switch 18 is designed so as to provide a signal by which the hydraulic unit 2 side and the vulcanizer side are cut off when pressure oil from the variable pumps 14 and 15 assumes 135 kgf/cm$^2$. When they are cut off, the variable pumps 14 and 15 stop their operation.

The main accumulator circuit 3 is connected to the hydraulic lines after the hydraulic unit 2 so as to accumulate pressure oil from the hydraulic unit and supply pressure oil to the vulcanizers 9 to 13 sides. In the accumulator circuit 3, four accumulators 19 to 22 are connected in parallel through a sequence valve 23 from the hydraulic line. The main accumulator circuit 3 supplies, when pressure oil of fixed capacity is accumulated, pressure oil to the vulcanizers 9 to 13 sides from the accumulated portion.

Figure 2:
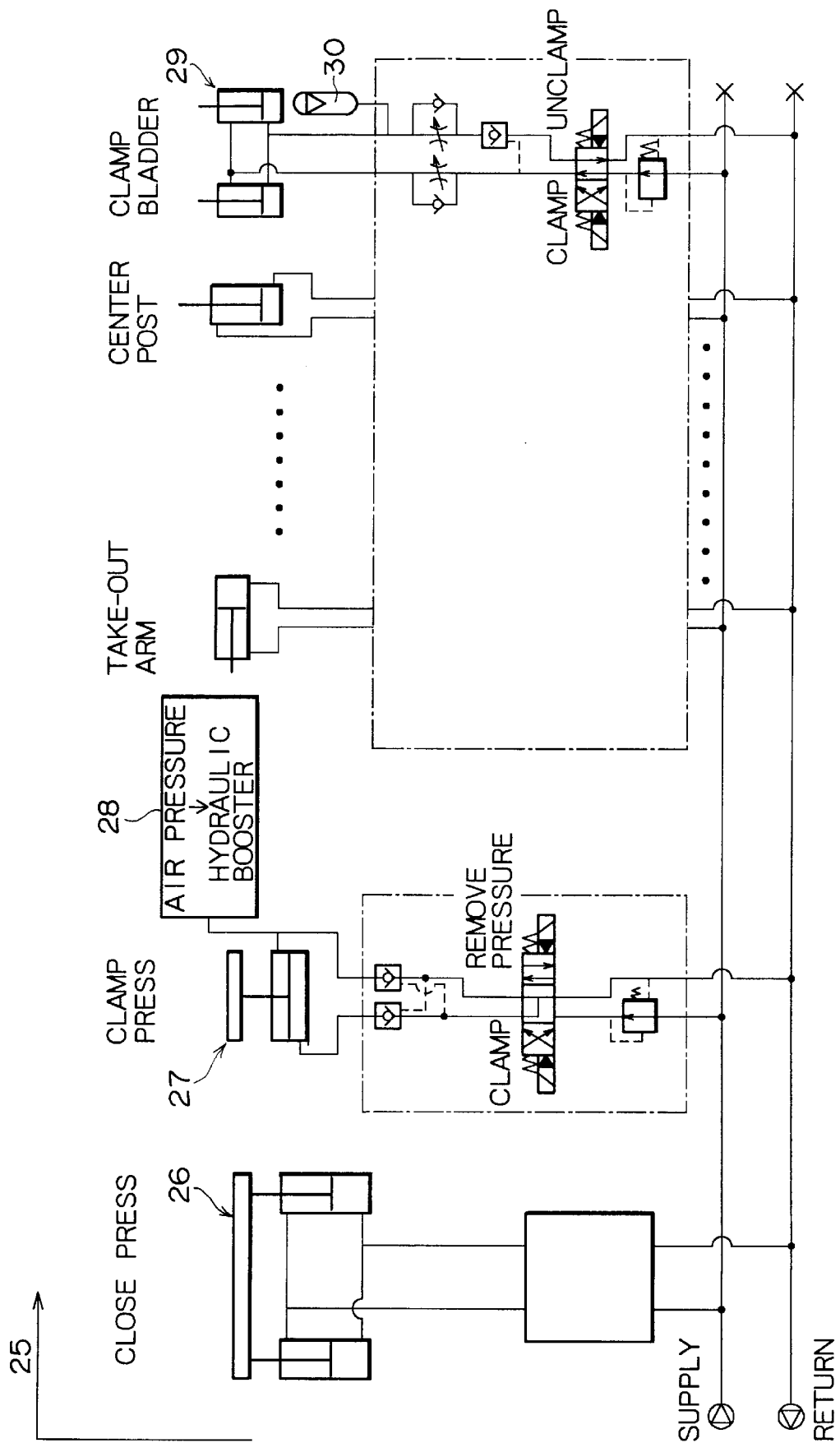
FIG. 2 is a view for explaining various actuators for a tire vulcanizer according to the present embodiment.
Figure 3:
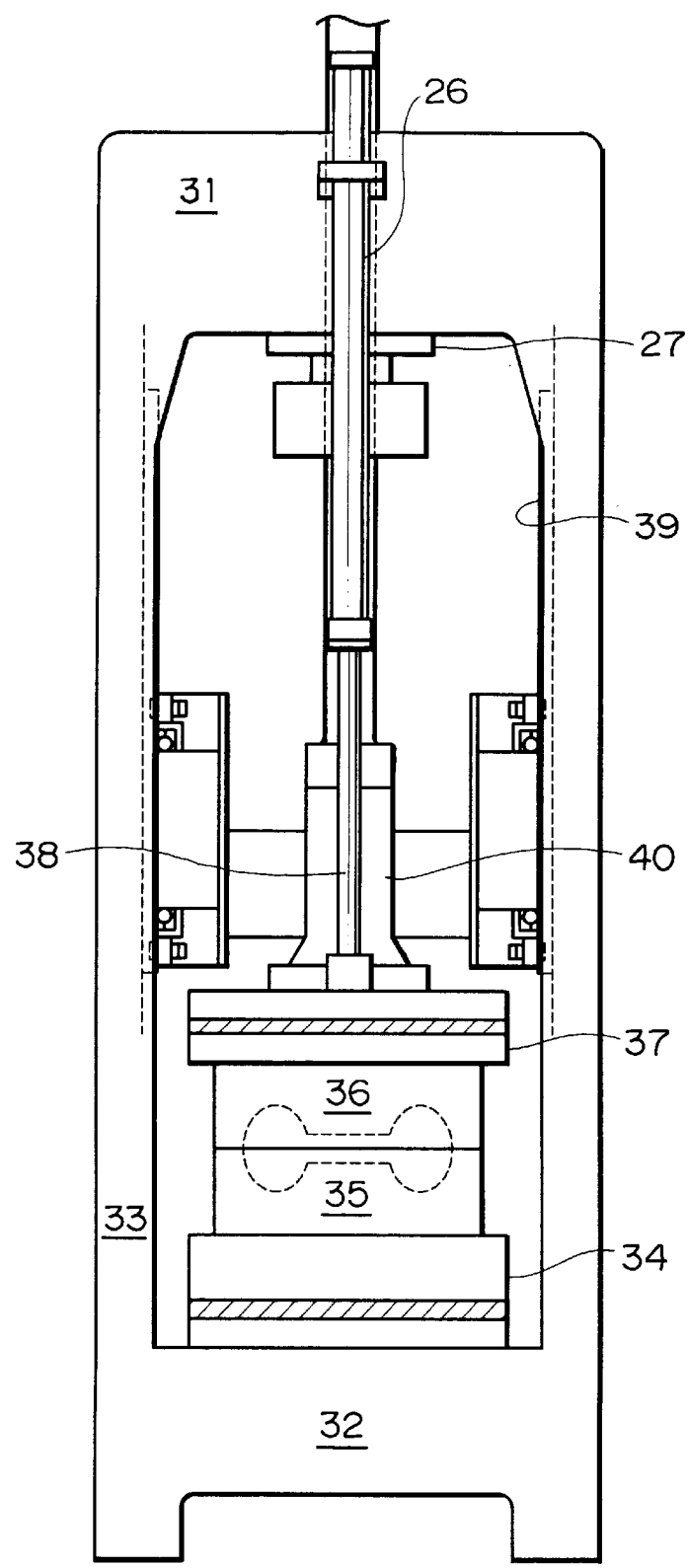
FIG. 3 is a view for explaining a tire vulcanizer according to the present embodiment.

When the dry cycle ends, the master valves 4 to 8 cuts off pressure oil from the main accumulator circuit 3 and the hydraulic unit 2. When pilot check valves are used for the master valves 4 to 8, the check function can be released by fixed pilot pressure caused by pressure oil of the hydraulic unit 2 and the main accumulator circuit 3. To the hydraulic line after the master valves 4 to 8 are connected, as shown in FIG. 2, various actuators such as a press closing cylinder 26 of the vulcanizers 9 to 13, a press clamping cylinder 27, a bladder clamp 29 (always generating a clamping force) and so on. The press closing cylinder 26 is used here to clamp a green tire prior to vulcanization, and to elevate an upper mold 36 when the tire after vulcanized is removed. That is, pressure oil from the main accumulators 19 to 22 and the small capacity variable pumps 14 and 15 is supplied to order to actuate various actuators during the dry cycle.

On the other hand, a pneumatic pressure hydraulic booster 28 constituting an amplifying circuit is connected to the press clamping cylinder 27, and even if the master valves 4 to 8 are closed to cut off pressure oil from the main accumulators 19 to 22 and the small capacity variable pumps 14 and 15, clamping of the upper and lower metal molds 36 and 35 can be done by pressure oil from the pneumatic pressure hydraulic booster 25. Further, an auxiliary accumulator 30 is connected to the bladder clamp 29, and even if the master valves 4 to 8 are closed to cut off pressure oil from the main accumulators 19 to 22 and the small capacity variable pumps 14 and 15, the bladder end can be clamped and held by pressure compensation of pressure oil from the auxiliary accumulator 30. When the discharged flow rate of the small capacity variable pumps 14 and 15 exceeds necessary flow rate of the vulcanizers 9 to 13 during the dry cycle, the remainder thereof is accumulated in the auxiliary accumulator 30. To other accumulators for which compensation of holding pressure of the hydraulic line is necessary during vulcanization are supplied pressure oil from the main accumulator circuit 3 opening the master valves 4 to 8 as necessary.

In the following, the operation of the hydraulic system for a tire curing press 1 will be described on the basis of the above-described constitution. As shown in FIG. 5, during the dry cycle (T0 to T1), pressure oil is supplied to various press actuators on the vulcanizers 9 to 13 side by the two small capacity variable pumps 14 and 15 and the main accumulator circuit 3. When the necessary flow rate of press exceeds its peak, the discharged flow rate of the two small capacity variable pumps 14 and 15 exceeds the necessary flow rate of press, and therefore, the remainder thereof is accumulated in the main accumulator and the auxiliary accumulator 30. In this manner, when a fixed quantity of pressure oil is supplied to the press, the upper metal mold 36 moves toward the lower metal mold 35 so that both the upper and lower metal molds 36 and 35 are closed to clamp the green tire. Then, the master valves 4 to 8 are closed to cut off a supply of pressure oil from the main accumulator circuit 3 and the hydraulic unit 2 and start the vulcanization of the green tire (T1).

Since the accumulated portion of the main accumulators 19 to 22 is lessened by the supply of pressure oil during the dry cycle, and pressure lowers, the small capacity variable pumps 14 and 15 supply pressure oil to the main accumulators 19 to 22 (T1). When oil is accumulated in the four accumulators 19 to 22 (T1 to T2), and pressure of the hydraulic line assumes 135 kgf/cm$^2$, pressure oil from the two variable pumps 14 and 15 is cut off by the check valves 16 and 17 of the hydraulic unit 2, and the variable pumps 14 and 15 stop their operation (T2). During the vulcanization (T1 to T5), pressure oil is supplied from the pneumatic pressure hydraulic booster 28 to the press clamping cylinder 27 to clamp the upper and lower metal molds and clamp the green tire. Further, pressure oil is supplied to the bladder clamp 29 in order to compensate for leakage of the pilot check valve from the auxiliary accumulator 30. Where other actuators are operated, the master valves 4 to 8 are opened (T3) to supply pressure oil from the main accumulator circuit 3 (T3 to T4). Since at that time, the check valves 16 and 17 of the hydraulic unit 2 are in the closed state, pressure oil of the main accumulator circuit 3 does not flow toward the variable pups 14 and 15 and the hydraulic tank 24.

As described above, when the master valves 4 to 8 are closed during the vulcanization, pressure of the hydraulic line after the master valves 4 to 8 lowers so that pressure oil does not leak from the hydraulic circuit of each oppress as in prior art, thus not making it necessary to compensate for the leakage. That is, since as in the prior art, the hydraulic unit 2 need not be always operated in order to compensate for leakage during the vulcanization, the energy saving operation can be accomplished. Further, since necessary flow rate of the press closing cylinder 26 can be compensated for by the main accumulator circuit 3, even if small pumps 14 and 15 are used for the hydraulic unit 2 as compared with prior art, the press closing can be accomplished within a fixed period of time (within the dry cycle for about one minute).

When two variable pumps of 135 kgf/cm$^2$, 55 l/min, and 15 kw are used for the small capacity variable pumps 14 and 15 of the hydraulic unit 2, the consuming power of the conventional hydraulic unit using the variable pump of 125 kgf/cm$^2$, 100 l/min, and 22 kw and the fixed pump of 170 l/min and 22 kw can be reduced by approximately 30%. In this case, the initial investment cost imposed on the unit is about double, but the initial investment cost can be recovered in about two years by the energy saving effect.

I claim:

1. A hydraulic system for a tire curing press, comprising:
   at least one tire press having at least one mold half movable by a hydraulic cylinder to open and close the press, and a hydraulic control valve;
   a hydraulic unit for supplying pressure oil of fixed pressure;
   an accumulator circuit for accumulating pressure oil from said hydraulic unit to supply the accumulated pressure oil to said hydraulic cylinder and said hydraulic control valve; and
   check means provided on every said tire press, said check means cutting off pressure oil of said hydraulic unit and said accumulator circuit during vulcanization of said tire press.

2. The hydraulic system for a tire curing press according to claim 1, further comprising:
   an auxiliary accumulator circuit provided on every said tire press, said auxiliary accumulator circuit accumulating an excess flow of said hydraulic unit, when a discharged flow rate of said hydraulic unit exceeds a required flow rate of said tire press.

* * * * *